US008284164B2

(12) United States Patent
Han

(10) Patent No.: US 8,284,164 B2
(45) Date of Patent: Oct. 9, 2012

(54) TOUCH INPUT DEVICE

(75) Inventor: Jae Young Han, Pyeongtaak (KR)

(73) Assignee: LG Electronics Inc., Seoul (KR)

( * ) Notice: Subject to any disclaimer, the term of this patent is extended or adjusted under 35 U.S.C. 154(b) by 1127 days.

(21) Appl. No.: 11/475,111

(22) Filed: Jun. 27, 2006

(65) Prior Publication Data

US 2006/0289284 A1 Dec. 28, 2006

(30) Foreign Application Priority Data

Jun. 28, 2005 (KR) ........................ 10-2005-0056618

(51) Int. Cl.
*G06F 3/041* (2006.01)

(52) U.S. Cl. ........................................ 345/173; 345/170

(58) Field of Classification Search .......... 345/156-184; 200/600
See application file for complete search history.

(56) References Cited

U.S. PATENT DOCUMENTS 4,772,769 A * 9/1988 Shumate ........................ 200/314
4,812,831 A * 3/1989 Laier ............................. 345/175
5,521,345 A * 5/1996 Wulc ............................. 200/317
7,196,836 B2 * 3/2007 Bauer et al. .................... 359/265
7,242,393 B2 * 7/2007 Caldwell ....................... 345/173
7,507,929 B2 * 3/2009 Streifler ........................ 345/173
2003/0122794 A1 * 7/2003 Caldwell ....................... 345/173

FOREIGN PATENT DOCUMENTS

KR 1020040015005 A 2/2004

* cited by examiner

*Primary Examiner* — Joe H Cheng
(74) *Attorney, Agent, or Firm* — Birch, Stewart, Kolasch & Birch, LLP

(57) ABSTRACT

The present invention relates to a touch input device. The touch input device of the present invention comprises a cover unit 20 which is formed with a reflective coating layer 22 on a surface thereof and made of a transparent material; a selective transmission unit 24 which is provided on a rear surface of the cover unit 20, formed with light-emitting holes 26 indicative of their respective functions and made of an opaque material; and a touchpad module 30 which includes light emitting devices 33 provided on a rear surface of the selective transmission unit 24 to provide light to the light-transmitting holes 26 and detects whether a user's body is touched onto the surface of the cover unit 20 to receive a detection signal. According to the touch input device of the present invention so configured, there are advantages in that it is possible to prevent the buttons from being inadvertently pressed down and operated, the external appearance of the electronic equipment to which the touch input device according to the present invention is employed can be relatively fine, and the buttons can be easily operated even in a dark place because the buttons are displayed with light.

7 Claims, 6 Drawing Sheets

TOUCH INPUT DEVICE

BACKGROUND OF THE INVENTION

1. Field of Invention

The present invention relates to a touch input device, and more particularly, to an input device wherein signals for operating electronic equipment can be inputted in touch mode.

2. Description of the Prior Art

As an example of electronic equipment, a portable terminal is herein described. Examples of the portable terminal include a mobile phone mainly with a telephone function, a personal digital assistant (PDA) mainly with an electronic organizer function, a smart phone with both a telephone function and an electronic organizer function, a portable multimedia center (PMC) or a portable multimedia player (PMP) capable of playing videos, and the like. FIG. 1 is a perspective view showing the configuration of related art electronic equipment.

As shown in the figure, a case 1 defines an external appearance of the electronic equipment. The case 1 is composed of a front panel 3 and a rear panel 5. The front panel 3 defines a front surface and some portions of side surfaces of the case 1, while the rear panel 5 defines a rear surface and the other portions of the side surfaces of the case 1.

A display unit 7 is provided to substantially occupy an upper half of the front panel 3. A liquid crystal panel or the like is used as the display unit 7 on which necessary information can be displayed. A jog button 9 and function buttons 9' are provided on a lower half of the front panel 3. Predetermined function of the jog and function buttons 9 and 9' can be performed when the buttons are pushed and operated. Additional function buttons 9' are also provided on the side surfaces of the case 1.

However, the related art touch input device has the following problems.

That is, the jog and function buttons 9 and 9' and the like are always exposed on the front panel 3 to the outside. In particular, since the jog and function buttons 9 and 9' are formed to protrude from a surface of the front panel 3, the buttons may be inadvertently pressed down.

Further, since the jog and function buttons 9 and 9' protrude from the front panel 3, the external appearance of the electronic equipment cannot be designed in various ways. Therefore, there is a problem in that a variety of consumer needs cannot be satisfied.

Furthermore, the related art jog and function buttons 9 and 9' cannot be easily identified and distinguished from one another in a dark place. Thus, there is another problem in that it is relatively difficult to operate the buttons 9 and 9' in a dark place.

SUMMARY OF THE INVENTION

Accordingly, the present invention is conceived to solve the aforementioned problems in the prior art. An object of the present invention is to provide a touch input device having no buttons protruding to the outside.

Another object of the present invention is to provide a touch input device having buttons which are displayed with light when the buttons are pressed down and operated.

According to an aspect of the present invention for achieving the objects, there is provided a touch input device, comprising: a cover unit with a reflective coating layer formed on a surface thereof; a selective transmission unit provided on a rear surface of the cover unit and formed with light-emitting holes indicative of their respective functions; and a touchpad module for detecting whether a user's body is touched onto the surface of the cover unit and receiving a detection signal, the touchpad module including light emitting devices provided on a rear surface of the selective transmission unit to provide light to the light-transmitting holes, wherein buttons are displayed on the cover unit using the light emitted through the light-transmitting holes.

Preferably, any one of the cover unit and selective transmission unit is first formed and then insert injection molded or double injection molded with the other unit such that the units can be formed integrally with each other.

Preferably, at least regions of the cover unit corresponding to the light-transmitting holes are formed of a transparent material and the selective transmission unit is formed of an opaque material.

Preferably, the touchpad module includes: a substrate provided with a main chip and capable of detecting static electricity; and the light emitting devices mounted to the substrate to provide the light-transmitting holes with the light for displaying the buttons.

Preferably, the main chip and the light emitting devices are mounted to a surface of the substrate opposite to the selective transmission unit, and one or more lenses are installed through the substrate to provide the light-transmitting holes of the selective transmission unit with the light from the light emitting devices.

Preferably, a shield plate is further provided such that the light emitted from the light emitting devices is delivered in a direction toward the light-transmitting holes but does not leak to the outside.

Preferably, the shield plate is integrally formed with the lenses through an insert injection or double injection molding process.

According to an aspect of the present invention for achieving the objects, there is provided a touch input device, comprising: a cover unit for selectively transmitting light to allow button shapes to be displayed thereon; and a touchpad module for detecting whether a user's body is touched onto a surface of the cover unit and receiving a detection signal, the touchpad module including light emitting devices provided on a rear surface of the cover unit to illuminate light onto the cover unit.

Preferably, a reflective coating layer is formed on the surface of the cover unit.

Preferably, the touchpad module includes: a substrate provided with a main chip and capable of detecting static electricity; and the light emitting devices mounted to the substrate to provide the cover unit with the light for displaying the button shapes.

Preferably, the main chip and the light emitting devices are mounted to a surface of the substrate opposite to the cover unit, and one or more lenses are installed through the substrate to illuminate the light from the light emitting devices onto the cover unit such that the button shapes can be displayed.

Preferably, a shield plate is further provided such that the light emitted from the light emitting devices is delivered in a direction toward the cover unit but does not leak to the outside, and the shield plate is integrally formed with the lenses through an insert injection or double injection molding process.

According to a touch input device of the present invention so configured, it is possible to prevent the buttons from being inadvertently pressed down and operated, the external appearance of the electronic equipment to which the touch input device according to the present invention is employed can be relatively fine, and the buttons can be easily operated even in a dark placed because the buttons are displayed with light.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, a preferred embodiment of a touch input device according to the present invention will be described in detail with reference to the accompanying drawings.

Figure 1:
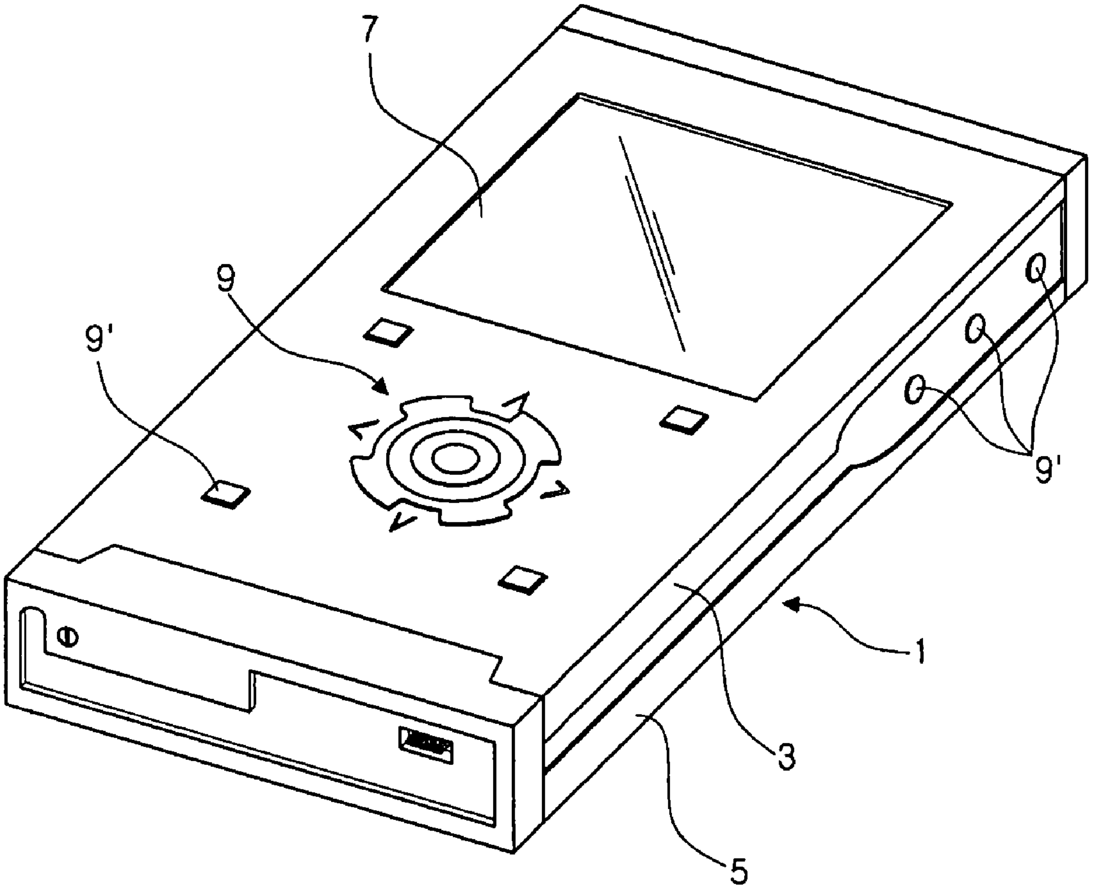
FIG. 1 is a perspective view showing an external appearance of a portable terminal according to a prior art.
Figure 2:
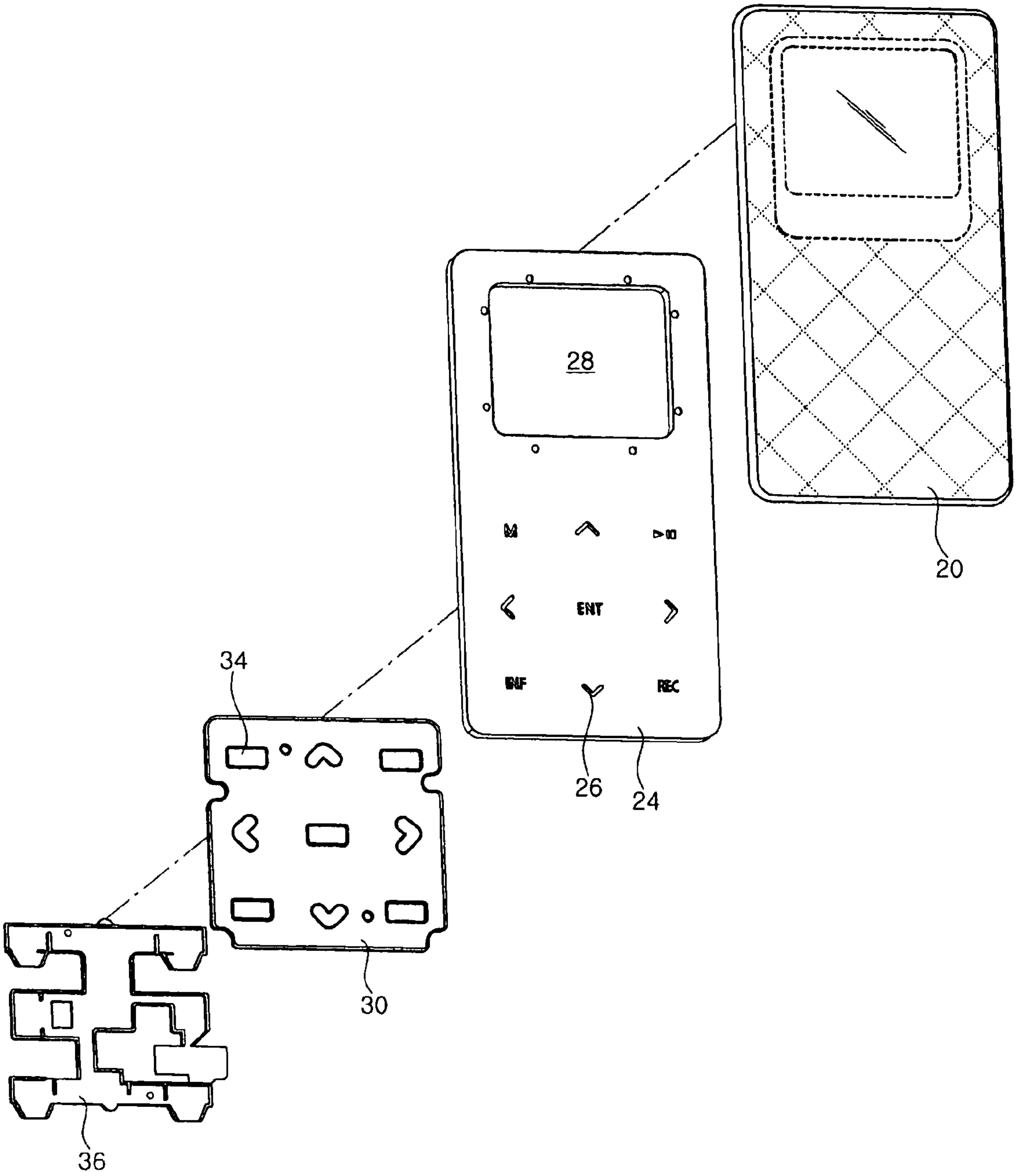
FIG. 2 is an exploded perspective view showing the main configuration of electronic equipment to which a touch input device according to a preferred embodiment of the present invention is employed.
Figure 3:
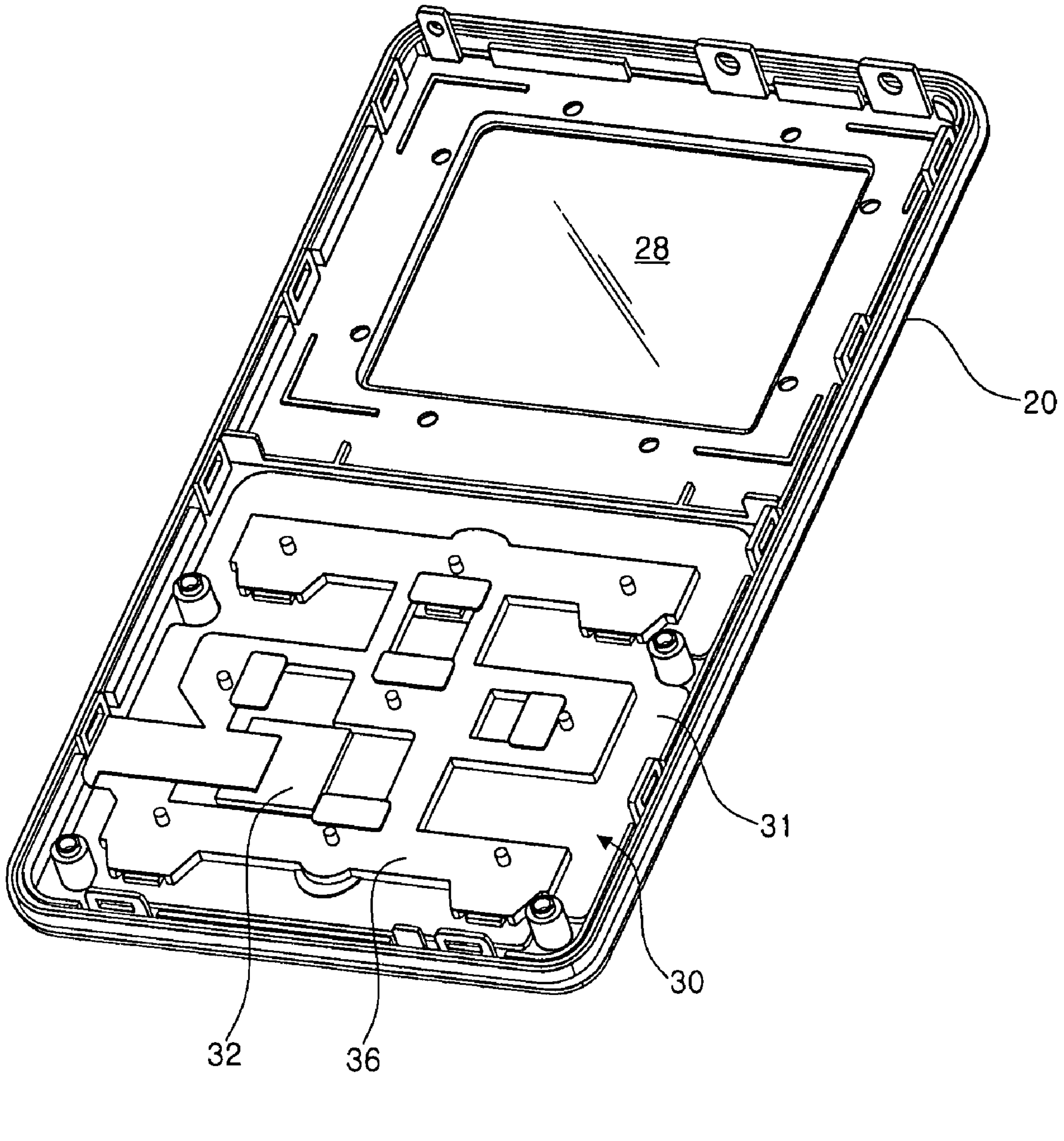
FIG. 3 is a rear perspective view showing the main configuration of the electronic equipment to which a touch input device according to a preferred embodiment of the present invention is employed.
Figure 4:
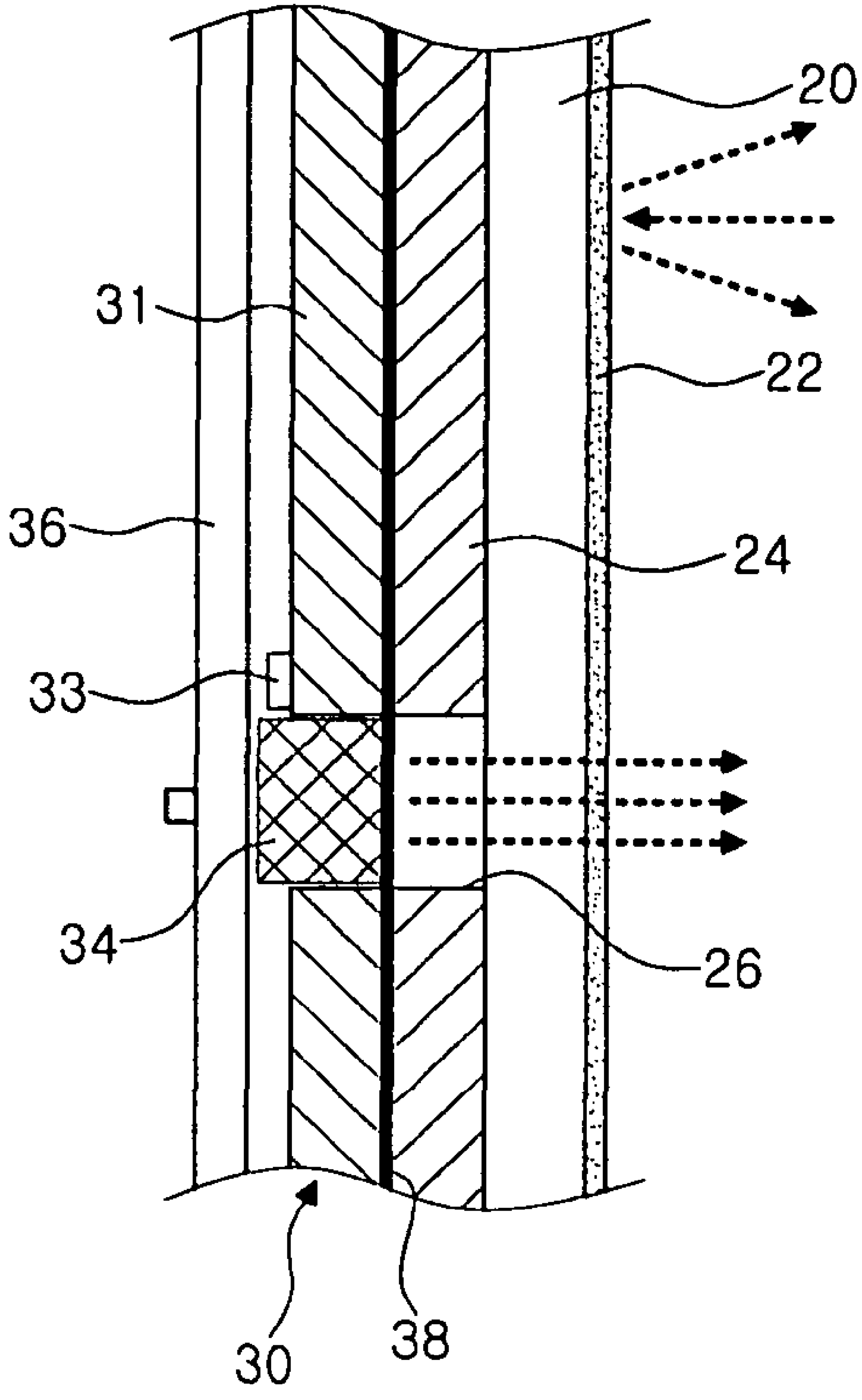
FIG. 4 is a sectional view of the main configuration showing the preferred embodiment of the present invention.

FIG. 2 is an exploded perspective view showing the main configuration of electronic equipment to which a preferred embodiment of a touch input device according to present invention is employed, FIG. 3 is a rear perspective view showing the main configuration of the electronic equipment to which a touch input device according to the preferred embodiment of the present invention is employed, and FIG. 4 is a sectional view showing the main configuration of the preferred embodiment of the present invention.

Referring to these figures, a cover unit 20 defines an external appearance of electronic equipment. The cover unit 20 is configured in such a manner that its regions corresponding to light-transmitting holes 26 to be explained below should formed of a transparent material. Of course, other regions not corresponding to the light-transmitting holes 26 need not be formed of a transparent material.

The cover unit 20 may be made of a transparent polycarbonate (PC) material. As shown in FIG. 4, a reflective coating layer 22 is formed on a surface of the cover unit 20. The reflective coating layer 22 serves to reflect light transferred from the outside to the cover unit 20 and transmit light penetrating through the cover unit 20 to the reflective coating layer 22.

A selective transmission unit 24 is provided on a rear surface of the cover unit 20. The selective transmission unit 24 is formed of an opaque material such that light emitted from a light emitting device 33 to be explained below can be selectively permeated. The selective transmission unit 24 may be made of an acrylonitrile butadiene styrene (ABS) or opaque PC material. An insert injection or double injection molding process may be employed such that the selective transmission unit 24 and the cover unit 20 can be formed integrally with each other.

That is, a relatively high heat-resistant material is first injection molded and then insert-injection molded such that the cover unit 20 and the selective transmission unit 24 can be formed integrally with each other. In this embodiment, the cover unit 12 is first formed of a relatively heat-resistant PC material and inserted into a mold for forming the selective transmission unit 24 such that the two units can be formed integrally with each other. Of course, the cover unit 20 and the selective transmission unit 24 may be formed through a double injection molding process.

A plurality of light-transmitting holes 26 are formed in the selective transmission unit 24. Each of the light-transmitting holes 26 is designed to have such a shape that a specific function of a relevant button can be displayed. Further, if a region on the surface of the cover unit 20 corresponding to a region of the selective transmission unit where the light-transmitting hole is formed is pressed down, the relevant button is considered to be pushed. The reason is that static electricity is transferred through the cover unit 20 and the selective transmission unit 24 to a touchpad module 30 to be explained below. Each of the light-transmitting holes 26 takes the shape of a symbol such as ‘<’ or ‘>’ in case of a direction button or a character such as ‘REC’ in case of an audio or video recording button.

In a case where the selective transmission unit 24 is formed into a case of the electronic equipment, a display window 28 may be formed thereon. The display window 28 is formed at an upper end of the selective transmission unit 24 to have a predetermined area, and a liquid crystal panel can be exposed to the outside through the display window.

For reference, the cover unit 20 can be configured in such a manner that the symbols or characters which can be displayed through the light-transmitting holes 26 can be selectively displayed on a structure other than the selective transmission unit 24 or the cover unit 20 itself using light. For example, predetermined regions on the cover unit 20 made of a transparent material except the symbols or characters serving as the light-transmitting holes 26 are painted such that light cannot pass through the regions.

The touchpad module 30 is installed on a rear surface of the selective transmission unit 24. The touchpad module 30 is a module for detecting, using static electricity, when a user's finger has been touched on the surface of the cover unit 20. For example, the touchpad module is used in a touchpad device of the notebook computer.

To this end, a structure for sensing the static electricity is mounted onto a front surface of a substrate 31 constituting the touchpad module 30, and a main chip 32 and a plurality of light emitting devices 33 are mounted onto a rear surface of the substrate 31. A plurality of lenses 34 are installed through the substrate 31, respectively, to transfer light emitted from the light emitting devices 33 to the light-transmitting holes 26. Each of the lenses 34 is formed to have an area equal to or greater than that of the light-transmitting hole 26 such that the light emitted from the light emitting device 33 can be sent to an entire area of the relevant light-transmitting hole 26. The lens 34 is made of a transparent or translucent material such that light can be transferred through the lens.

A shield plate 36 for allowing the light emitted from the light emitting devices 33 not to be transferred rearward of the touchpad module 30 is provided on the rear surface of the substrate 31. To this end, the shield plate 36 is made of a translucent material. The shield plate 36 is preferably formed integrally with the lens 34 through the insert injection or double injection molding process.

The touchpad module 30 is attached to a rear surface of the selective transmission unit 24 using an adhesive tape 38 such as a transparent double-sided adhesive tape. Of course, the touchpad module 30 may be attached to the selective transmission unit 24 in various ways. For example, screws may be used when the touchpad module 30 is attached to the selective transmission unit 24.

Hereinafter, the operation of the touch input device according to the present invention so configured will be described in detail.

The touch input device of the present invention detects when a user's finger is touched to a predetermined surface of the input device, i.e. the surface of the cover unit 20, and performs a specific function of a button corresponding to the touched region.

At this time, the touch input device may be designed in such a manner that when the finger is first touched to the cover unit 20, the specific function of the relevant button is not directly performed but light is once emitted from the light emitting devices 33. Alternatively, the touch input device may be designed such that the light emission from the light emitting devices 33 and the specific function of a button corresponding to an initially pressed region can be simultaneously performed.

Once light is emitted from the light emitting devices 33, the emitted light is transferred to the lenses 34 and then to the respective light-transmitting holes 26 by means of the lenses 34. The light transmitted to the respective light-transmitting holes 26 is penetrated through the cover unit 20 and transmitted to the outside such that the user can recognize the symbols or characters corresponding to the shapes of the light-transmitting holes 26.

In such a way, the user can recognize positions of the buttons using the light transmitted through the light-transmitting holes and cause his/her finger to be touched onto a desired region on the cover unit such that a relevant function can be performed.

Now, it will be explained that the buttons are displayed to the outside of the cover unit 20, with reference to FIGS. 5*a* and 5*b*.

Figure 5A:
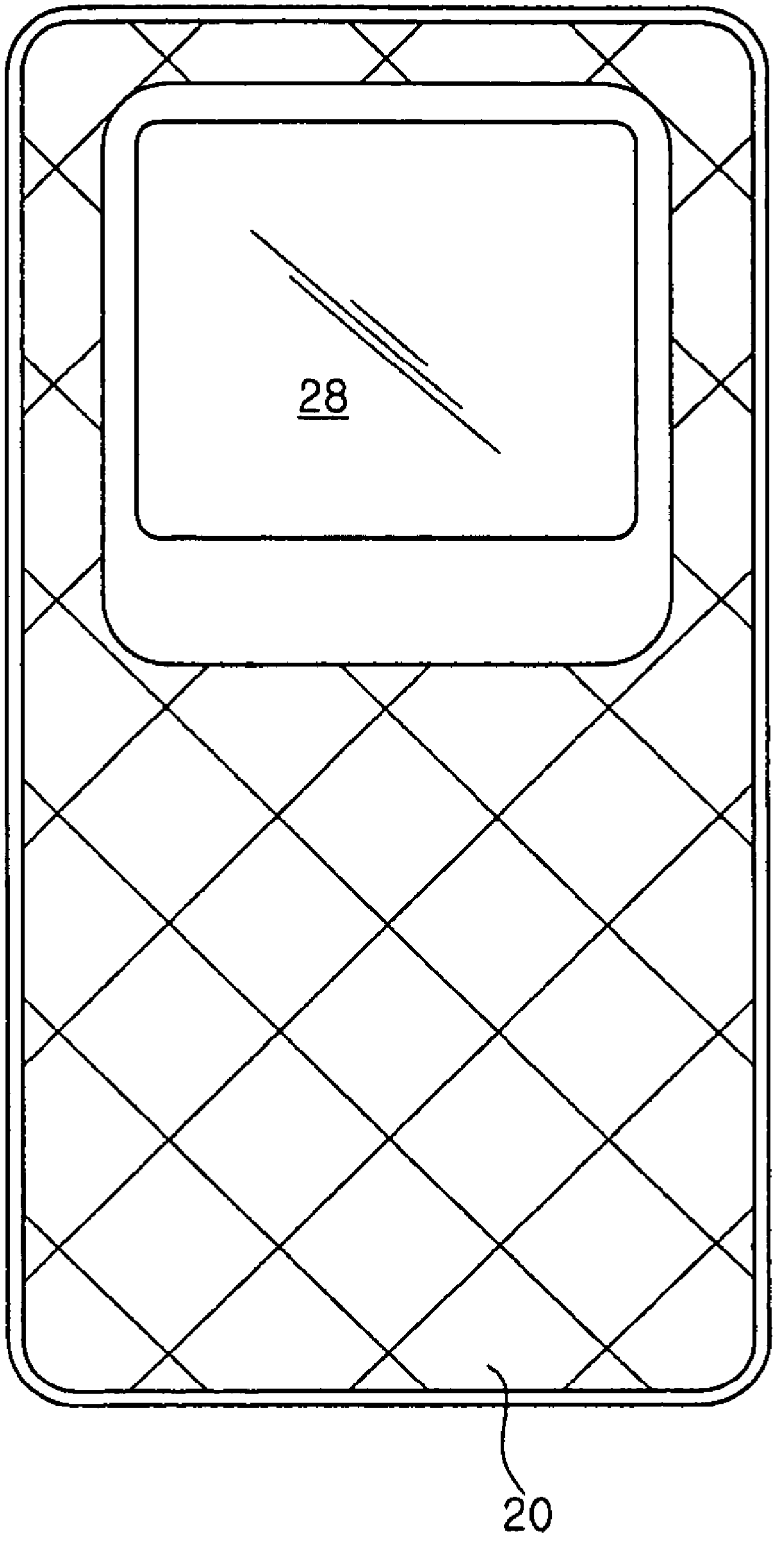
FIG. 5*a* is a view showing the touch input device according to the preferred embodiment of the present invention in a state where a light emitting device is not operated.
Figure 5B:
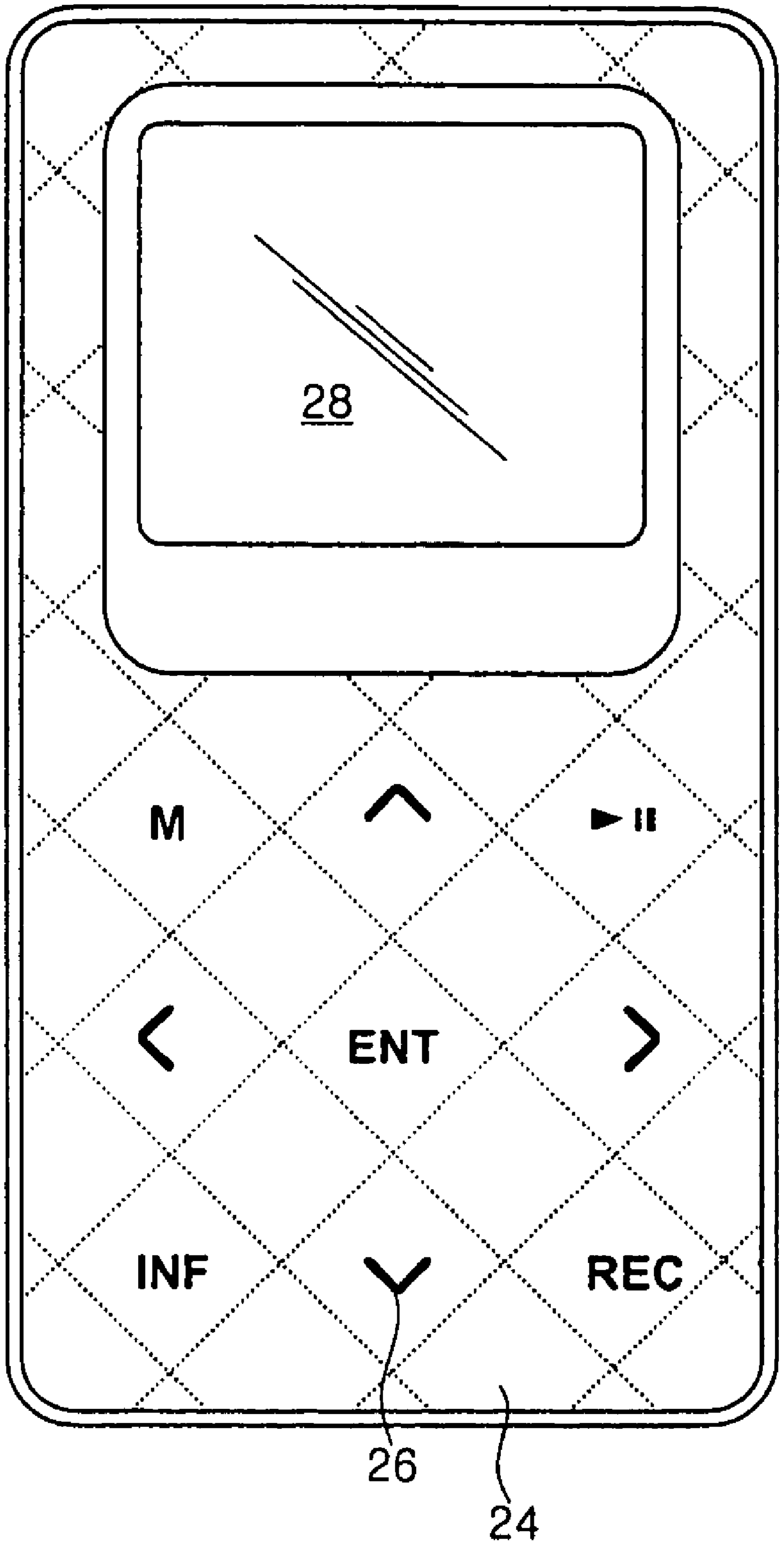
FIG. 5*b* is a view showing the touch input device according to the preferred embodiment of the present invention in a state where a light emitting device is operated.

First, FIG. 5*a* shows a state where the touch input device according to the preferred embodiment of the present invention is not operated. That is, light cannot be emitted from the light emitting devices 33 and thus cannot be transmitted to the light-transmitting holes 26. Further, since the reflective coating layer 22 is formed on the cover unit 20 and the external light delivered to the cover unit is also reflected, the shapes of the light-transmitting holes 26 are not exposed to the outside.

However, if the user touches a position on the cover unit 20 corresponding to the touchpad module 30, light is emitted from the light emitting devices 33 and exposed (→ transmitted) to the outside of the cover unit 20 through the light-transmitting holes 26. Accordingly, predetermined symbols or characters can be displayed using the emitted light in accordance with the shapes of the light-transmitting holes 26 as shown in FIG. 5*b*. Thus, the user can touch a desired one of the buttons expressed in the form of the respective symbols or characters and select the predetermined function of the touched button.

A touch input device according to the present invention so configured has the following advantageous effects.

First no buttons protrude to the outside of the input device, and the input device is operated by detecting static electricity generated when a user's finger is merely touched to the surface of the input device. Therefore, since the buttons are not operated when the buttons are inadvertently pressed down, it is possible to prevent the electronic equipment from being inadvertently operated.

Further, since no buttons protrude to the outside of the input device, a surface of the electronic equipment can be designed in various shapes. Therefore, the finer external appearance of the electronic equipment to which the touch input device is employed can be obtained.

Furthermore, the present invention is configured in such a manner that light emitted from the light emitting devices installed in a touchpad device can be used to display the symbols or characters indicative of the specific functions of the buttons. Thus, since the light is used to display the buttons, the operation of the input device can be performed even in a dark place.

The scope of the present invention is not limited to the embodiment described and illustrated above but defined by the appended claims. Therefore, it is apparent to those skilled in the art that various modifications and changes can be made within the scope of the present invention defined in the append claims.

For example, although it has been described in the illustrated embodiment that the touch input device is applied to specific electronic equipment, any type of the touch input device comprising a transparent cover unit formed with a reflective coating layer, a selective transmission unit formed with light-transmitting holes, and a touchpad module for transmitting light through lenses and sensing a user's touch can be applied to a variety of electronic equipment.

What is claimed is:

1. A touch input device, comprising:

a cover unit with a reflective coating layer formed on a surface thereof;

a selective transmission unit provided on a rear surface of the cover unit and formed with light-transmitting holes indicative of their respective functions; and a touchpad module for detecting whether a user's body is touched onto the surface of the cover unit and receiving a detection signal, the touchpad module including:

a substrate provided with a main chip and capable of detecting static electricity; and light emitting devices provided on a rear surface of the substrate to provide light to the light-transmitting holes, the light emitting devices providing the light-transmitting holes with light, wherein buttons are displayed on the cover unit using the light emitted through the light-transmitting holes, one or more lenses are installed through the substrate to provide the light-transmitting holes of the selective transmission unit with the light from the light emitting devices, the one or more lenses having a first surface coplanar with a front surface of the substrate and a rear surface extending beyond the rear surface of the substrate, and wherein the size and shape of each of the light-transmitting holes is substantially equal to the size and shape of a corresponding lens of the one or more lenses, each light-transmitting hole overlying a lens.

2. The touch input device as claimed in claim 1, wherein any one of the cover unit and selective transmission unit is first formed and then insert injection molded or double injection molded with the other unit such that the units can be formed integrally with each other.

3. The touch input device as claimed in claim 1, wherein at least regions of the cover unit corresponding to the light-transmitting holes are formed of a transparent material and the selective transmission unit is formed of an opaque material.

4. The touch input device as claimed in claim 1, wherein a shield plate is further provided such that the light emitted from the light emitting devices is delivered in a direction toward the light-transmitting holes but does not leak to the outside.

5. The touch input device as claimed in claim 4, wherein the shield plate is integrally formed with the lenses.

6. The touch input device as claimed in claim 4, wherein the shield plate is formed of translucent material.

7. The touch input device as claimed in claim 4, wherein the shield plate is spaced from the substrate.

* * * * *